US008290813B2

(12) United States Patent
Prorock

(10) Patent No.: US 8,290,813 B2
(45) Date of Patent: Oct. 16, 2012

(54) METHOD TO ENSURE MAINTENANCE OF INDIVIDUAL GOVERNMENT BENEFITS IN A RETAIL ENVIRONMENT

(75) Inventor: Thomas J. Prorock, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1843 days.

(21) Appl. No.: 11/021,945

(22) Filed: Dec. 23, 2004

(65) Prior Publication Data

US 2006/0143077 A1 Jun. 29, 2006

(51) Int. Cl.
*G06Q 30/00* (2006.01)
(52) U.S. Cl. ....................................................... 705/14
(58) Field of Classification Search ..................... 705/14
See application file for complete search history.

(56) References Cited

U.S. PATENT DOCUMENTS

| 6,757,530 B2 | 6/2004 | Rouse et al. | |
|---|---|---|---|
| 2002/0052843 A1* | 5/2002 | Canon | 705/41 |
| 2002/0120539 A1 | 8/2002 | Price | |
| 2004/0059634 A1 | 3/2004 | Tami et al. | |
| 2004/0133474 A1 | 7/2004 | Tami et al. | |
| 2006/0074784 A1* | 4/2006 | Brown | 705/35 |
| 2007/0198432 A1* | 8/2007 | Pitroda et al. | 705/64 |

* cited by examiner

*Primary Examiner* — Alvin L Brown
(74) *Attorney, Agent, or Firm* — H. Barrett Spraggins; Biggers & Ohanian, LLP

(57) ABSTRACT

Aspects to ensure maintenance of individual government benefits in a retail environment include identifying of an individual shopper with an associated level of available benefits during a shopping session. Purchases relative to predetermined criteria, including the associated level of available benefits, are tracked. Scheduling a next appointment during the shopping session for the individual shopper with an agency providing the government benefits based on the tracking occurs, wherein a potential lapse in benefits is avoided.

15 Claims, 2 Drawing Sheets

METHOD TO ENSURE MAINTENANCE OF INDIVIDUAL GOVERNMENT BENEFITS IN A RETAIL ENVIRONMENT

FIELD OF THE INVENTION

The present invention relates to government benefits for individuals in a retail environment, and more particularly to ensuring maintenance of individual government benefits in a retail environment.

BACKGROUND OF THE INVENTION

In the United States, the U.S. Department of Agriculture's ("USDA's") Food Stamp Program (the "FSP") provides the nation's cornerstone federal food assistance program for low-income Americans. In addition, the USDA also manages the Special Supplemental Nutrition Program for Women, Infant and Children ("WIC"), which is a program that addresses the special needs of at-risk, low-income pregnant, breast-feeding and postpartum women, infants and children by providing them with "prescribed" supplemental food packages targeted to the dietary needs of the individual participants. The USDA's FSP and WIC programs historically have operated by the delivery of paper-based food stamp coupons or WIC vouchers to program participants who used these documents to purchase eligible and prescribed food items at participating retailers.

Currently, both the Food Stamp and WIC programs are migrating toward Electronic Benefit Transfer ("EBT") cards, in which program benefits electronically are delivered to program participants at the point-of-sale (POS) in retailer locations. These EBT cards are currently issued on debit and "smart card" payment distribution and processing platforms that are managed by third party bank clearinghouses. In the EBT environment, the retailer can rely upon the customer's "swiping" of his/her EBT card through a magnetic or "smart" card reader and input of an associated personal identification number ("PIN") on an attached keypad to ensure authenticity of the program beneficiary and availability of sufficient funds to pay for the instant transaction. EBT-based transactions enable both retailers and the U.S. government to reduce fraudulent redemption of paper-based benefits.

With the WIC-EBT smart card, a 'prescription' is contained for each individual that defines the types of products and the benefit quantity that is allowed for each of the products. The WIC participant can only get the benefits by scheduling an appointment and then reviewing the specific situation to determine the tailored 'prescription' that will meet the nutritional needs of the individual. When the benefits run out, the participant is required to schedule another appointment to have additional benefits (i.e., a new 'prescription') added to the smart card. Scheduling and knowing when there is a need to schedule an appointment can be problematic. It may not always be obvious to the WIC participant that there is a need to make another appointment for more benefits, which can result in a significant problem during the next shopping trip. Further, even if reminders may be given, the participant still needs to schedule the appointment to receive the additional benefits.

Accordingly, a need exists for a more efficient and effective manner of ensuring maintenance of individual government benefits in a retail environment, including appointment scheduling during a shopping session. The present invention addresses such a need.

BRIEF SUMMARY OF THE INVENTION

Aspects to ensure maintenance of individual government benefits in a retail environment are provided. Included in the aspects is the identifying of an individual shopper with an associated level of available benefits during a shopping session. Purchases relative to predetermined criteria, including the associated level of available benefits, are tracked. Scheduling a next appointment during the shopping session for the individual shopper with an agency providing the government benefits based on the tracking occurs, wherein a potential lapse in benefits is avoided.

Through the present invention, a straightforward and effective technique is provided for maintaining individual government benefits in a retail environment. More particularly, a participant in the WIC-EBT program is ensured against a lapse in WIC benefits and is provided the opportunity to schedule an appointment with the government agency to obtain more benefits during the shopping session. These and other advantages of the aspects of the present invention will be more fully understood in conjunction with the following detailed description and accompanying drawings.

DETAILED DESCRIPTION OF THE INVENTION

Figure 1:
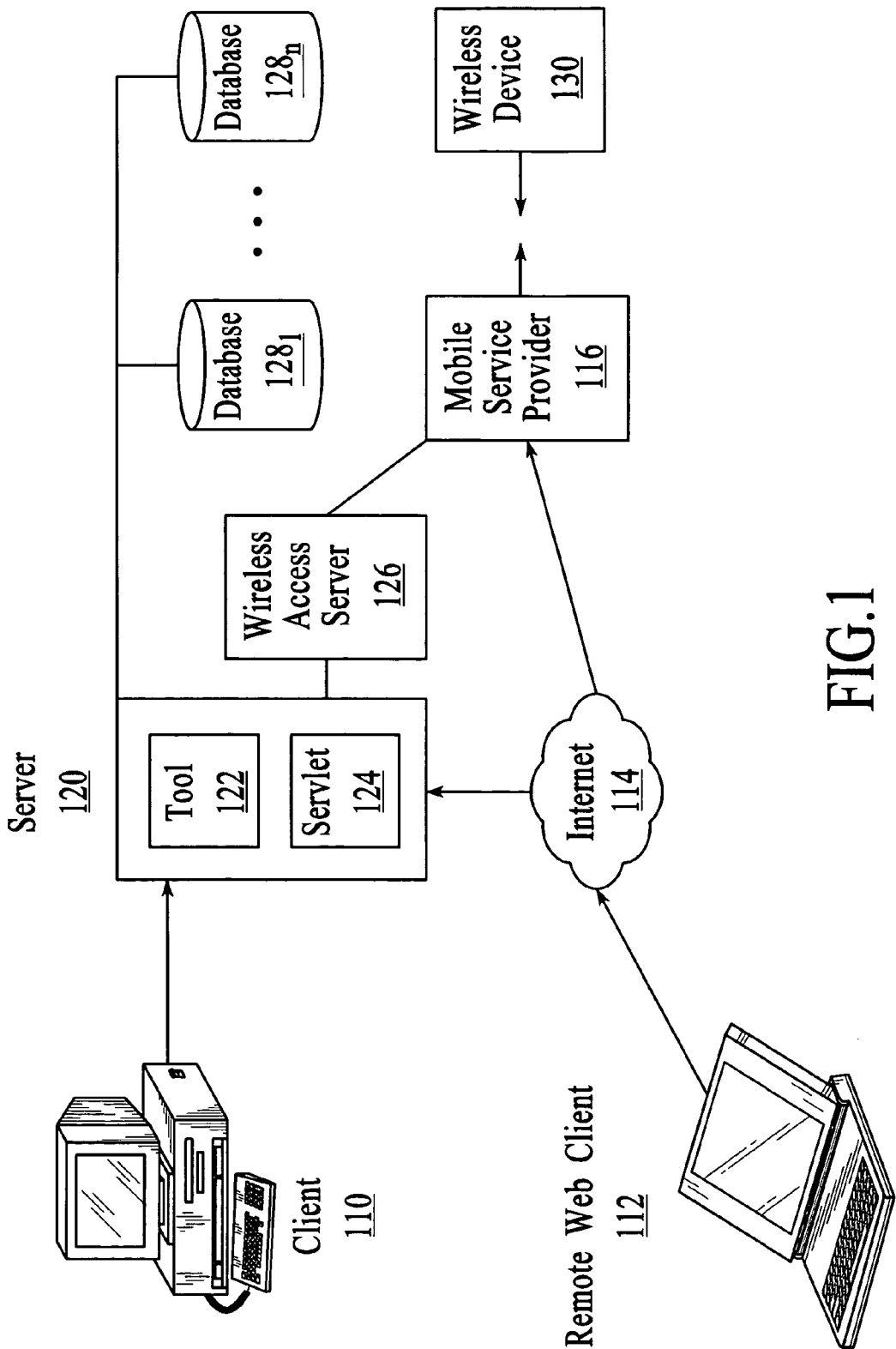
FIG. 1 illustrates a diagram of a functional overview of a system suitable for implementing the aspects of the present invention.

The present invention relates to ensuring maintenance of individual government benefits in a retail environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A diagram of a functional overview of a system suitable for implementing the aspects of the present invention in a retail POS environment is described with reference to FIG. 1. One or more clients 110 may access a server 120 through a terminal. In addition, one or more remote web clients 112 may access server 120 through Internet 114 or other communication means. Server 120 may comprise various modules, databases and other functions, such as tool 122 and servlet 124. In addition, one or more databases 128$i$-128$n$ may store information related to directories, calendar, scheduling applications, and/or other applications. Other components, functions, and databases may also be provided. A wireless access server 126 may be connected to a Mobile Server Provider 116, which may also communicate through Internet 114. Mobile Server Provider 116 provides communication with one or more mobile devices 130. This system enables a wireless device to access and interact with information stored and maintained on Server 120. The present invention further provides that the information transmitted to and from mobile device 130 will be in a format acceptable for display and access on a mobile device.

The wireless implementation of the present invention may include a mobile application development tool 122 and a wireless servlet 124 which runs on Server 120. Other components, tools and applications may also run on Server 120. Tool 122 may serve to allow the design of a mobile version of applications to run (or execute) successfully on various wireless devices. Servlet 124 may provide wireless device users real-time access to various databases and other information maintained on Server 120.

With the system structure of FIG. 1, support exists for the utilization of Web Services Technology that allows a WIC-EBT participant, referred to herein as the 'shopper', to schedule an appointment with the WIC Agency via the mobile device 130, such as a personal shopper device while they are shopping in the store. As is well known in the art, such personal shopper devices refer to cart-mounted computers that provide a wireless touch-screen device that is attached to a shopping cart and scans in items placed in the cart by shoppers, keeping a running total of how much is being spent, e.g., the Shopping Buddy (currently available for use in Stop & Shop stores in Massachusetts), or the Cart Companion available from Cuesol, Inc. of Quincy, Mass. Of course, while the personal shopper device is referenced in a preferred embodiment, this is meant as illustrative and not restrictive of the type of POS device in use by the shopper. Other types of POS devices that could be used by the shopper include a kiosk, customer service desk, or an interactive device facing the shopper at a POS display. A Web Service is based on SOA, Service Oriented Architecture. As is well understood in the art, the SOA is a standardized way for software applications to access services on the Internet/intranet and enables Web applications that may have been developed using different technologies (e.g., JAVA, NET, etc.) to work seamlessly together. The SOA comprises three main components: Publish, Find, and Bind.

In accordance with the present invention, the WIC Agency publishes three available services: 1) the service to return the scheduling lead time for a selected WIC Agency; 2) the service to present a list of open time slots at the selected agency; and 3) the service to actually book the appointment. The personal shopper device uses the SOA Find function to locate the desired WIC-EBT Web Service and find the published service for the WIC scheduling service, and once found, then uses the SOA Bind function to access/bind and invoke the functions of the WIC-EBT Web Service by making calls to the APIs (application program interfaces) in the published service.

Figure 2:
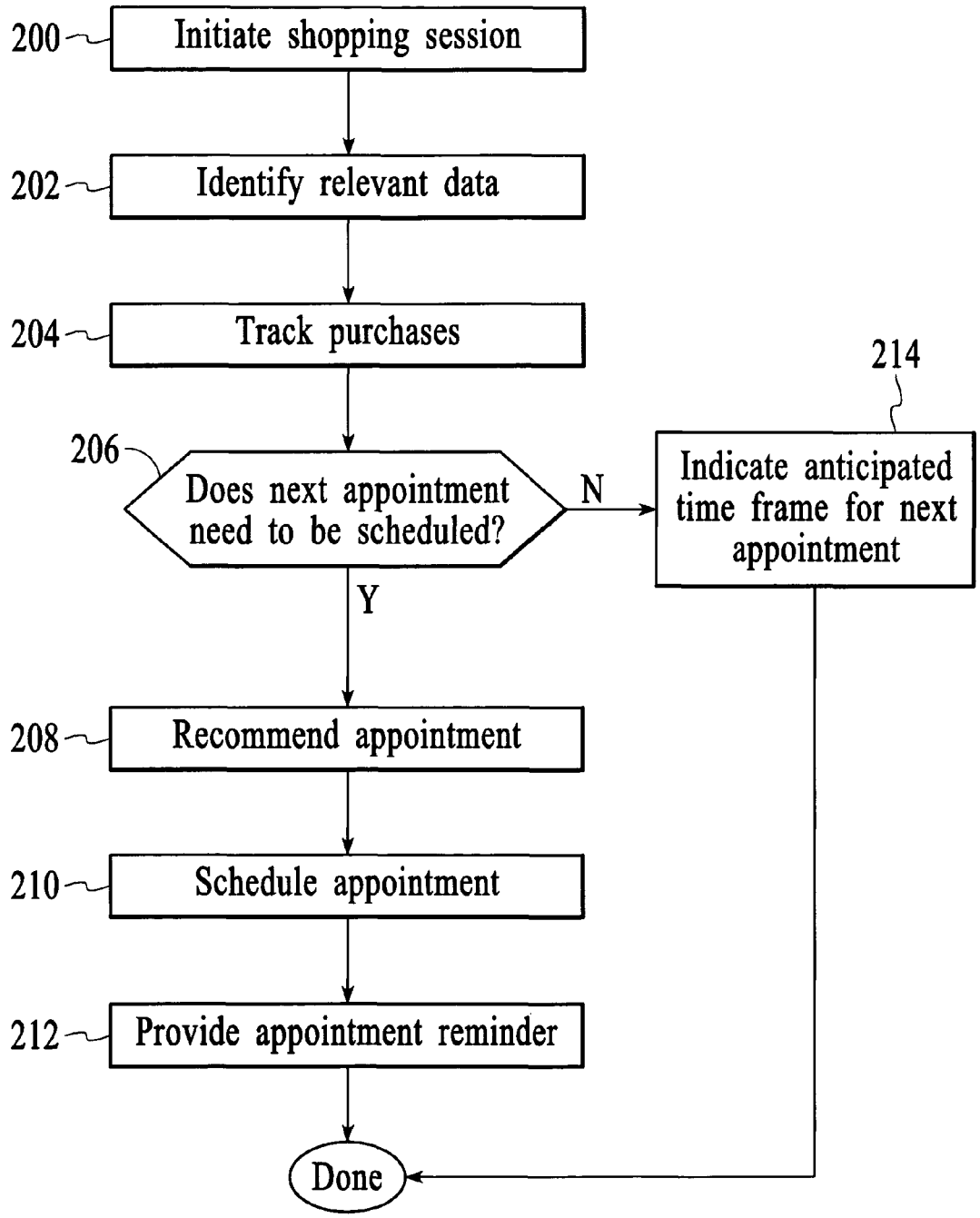
FIG. 2 illustrates a flow diagram of an appointment scheduling method to ensure maintenance of individual government benefits in a retail environment in accordance with the present invention.

A flow diagram of an appointment scheduling method to ensure maintenance of individual government benefits in a retail environment in accordance with the present invention is illustrated in FIG. 2. The process begins upon initiation of a shopping session (step 200), e.g., when a shopper swipes their smart card through a reader in the personal shopper device. As the WIC-EBT shopper initiates a shopping session via the personal shopper device, identification of the relevant WIC data ensues (step 202). That is, a request is made via the WIC-EBT web service to locate the WIC-EBT agency that authorized the customer's 'prescription' for the WIC-EBT smart card and then to determine the lead time required to make/schedule an appointment at this agency (e.g., the lead time may vary based on current and projected case loads, the amount of staff, seasonal variations, etc.)

Relevant data for the shopper is also tracked as purchases occur (step 204) since there is access to all of the allowed benefits by product category for that shopper, which can be adjusted as purchases are made. Based on the rate of purchase (from the shopper's history), the amount of benefit left on the smart card, and the amount of lead time that is required to make an appointment at the WIC agency, a determination is made as to whether a need for a next appointment exists (step 206). When there is a need for a next appointment, the user is notified that it is recommended that they make an appointment, so that there is not a lapse in their WIC benefits (step 208). An option is provided at that point to schedule the appointment using the personal shopper device. To make the appointment, the software in the personal shopper device uses a web service to contact the WIC agency and present a list of open time slots for the shopper to select. This scheduling may be further facilitated by a profile that the shopper may build and pass into the web service. For example, the profile may indicate that the shopper is available on Monday's or in the afternoons. The web service then can factor in this profile information and present openings accordingly. The shopper then selects the time slot for the appointment via the personal shopper device (step 210). A reminder of the scheduled appointment is provided, such as displayed on a point of sale display and on a print-out after the final sales receipt has been printed (step 212).

In the case where an appointment is not required, at the end of the sale transaction, the shopper is presented with a notification that they will need to make an appointment in a certain time period, e.g., days, weeks, months, (step 214), such as via a display or print-out. Of course, this notification occurs based on the shopping history/rate of purchases, the amount of benefit left on the smart card, and the lead time of the WIC agency. The notification can be provided as an anticipated date for a next scheduled appointment.

Thus, through the present invention, a straightforward and effective technique is provided for maintaining individual government benefits in a retail environment. More particularly, a participant in the WIC-EBT program is ensured against a lapse in WIC benefits and is provided the method to schedule an appointment with the government agency to obtain more benefits.

Although the present invention has been described in accordance with the embodiments shown, one of ordinary skill in the art will readily recognize that there could be variations to the embodiments and those variations would be within the spirit and scope of the present invention. For example, although the aspects of the present invention are described relative to the WIC-EBT program, the features of the present invention are applicable to other programs that are similar to the nature and needs of the WIC-EBT program. Accordingly, many modifications may be made by one of ordinary skill in the art without departing from the spirit and scope of the appended claims.

I claim:

1. A method to ensure maintenance of individual government benefits in a retail environment, the method comprising:
   identifying an individual shopper with an associated level of available benefits during a shopping session;
   tracking purchases relative to predetermined criteria, including the associated level of available benefits; and
   scheduling a next appointment during the shopping session for the individual shopper with an agency providing the government benefits based on the tracking, wherein a potential lapse in benefits is avoided.

2. The method of claim 1 wherein identifying further comprises identifying through a smart card.

3. The method of claim 2 wherein tracking further comprises determining a history of a rate of purchase for the identified shopper, an amount of the available benefits left, and a lead time required to make an appointment with a particular agency as the predetermined criteria.

4. The method of claim 3 wherein scheduling further comprises scheduling via a personal shopper device in use by the shopper.

5. The method of claim 4 wherein scheduling further comprises providing available time slots for the next appointment when an immediate need for scheduling the next appointment exists based on the tracking during the shopping session.

6. The method of claim 5 further comprising providing a reminder of a selected time slot for the next appointment.

7. The method of claim 5 further comprising providing a notice of an expected date when the next appointment may be needed if an immediate need does not exist based on the tracking during the shopping session.

8. The method of claim 4 further comprising utilizing SOA (Service Oriented Architecture) components of publish, find, and bind during the performance of the identifying, tracking, and scheduling.

9. The method of claim 8 wherein utilizing the SOA component of publish further comprises publishing services by the particular agency, the services including a service to query for the lead time for the particular agency, a service to return a list of open time slots for appointments, and a service to book an appointment.

10. The method of claim 9 wherein utilizing the SOA components of find and bind further comprises finding with the personal shopper device a published service for scheduling, and binding to the published service to make calls to APIs in the published service.

11. A method for ensuring maintenance of individual government benefits in a retail environment, the method comprising:
notifying an individual shopper during a shopping session of a need to make an appointment for obtaining further government benefits; and
scheduling the appointment during the shopping session with an agency providing the government benefits.

12. The method of claim 11 further comprising utilizing a business rules determination for the notifying based on a rate of purchase in a history for the individual shopper, an amount of benefits remaining for the individual shopper, and an amount of lead time to make an appointment with the agency.

13. The method of claim 11 further comprising utilizing SOA (Service Oriented Architecture) components of publish, find, and bind during the performance of the notifying and scheduling.

14. The method of claim 11 wherein the government benefits further comprise benefits for a WIC-EBT (Women, Infant, and Children—Electronic Balance Transfer) program provided by a WIC agency.

15. The method of claim 11 wherein scheduling further comprises providing available time slots for the appointment by considering agency availability along with personal criteria input by the individual shopper regarding appointment time preferences.

* * * * *